United States Patent
Li et al.

(10) Patent No.: US 11,195,259 B2
(45) Date of Patent: Dec. 7, 2021

(54) APPARATUS AND METHOD FOR DYNAMIC MULTI-CAMERA RECTIFICATION USING DEPTH CAMERA

(71) Applicant: Samsung Electronics Co., Ltd., Suwon-si (KR)

(72) Inventors: Yingmao Li, Allen, TX (US); Chenchi Luo, Plano, TX (US); George Q. Chen, Plano, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 16/703,712

(22) Filed: Dec. 4, 2019

(65) Prior Publication Data

US 2021/0174479 A1    Jun. 10, 2021

(51) Int. Cl.
*G06T 5/00*  (2006.01)
*G06T 5/50*  (2006.01)
(Continued)

(52) U.S. Cl.
CPC ............ *G06T 5/006* (2013.01); *G06T 3/0093* (2013.01); *G06T 5/40* (2013.01); *G06T 5/50* (2013.01);
(Continued)

(58) Field of Classification Search
None
See application file for complete search history.

(56) References Cited

U.S. PATENT DOCUMENTS 7,912,319 B2  3/2011  Lakshamanan et al.
8,189,100 B2  5/2012  Li et al.
(Continued)

FOREIGN PATENT DOCUMENTS

CN       108369728 A  *  8/2018  ............ G01S 17/08
KR    10-2013-0085142 A       7/2013
(Continued)

OTHER PUBLICATIONS

International Search Report and the Written Opinion of the International Searching Authority dated Dec. 8, 2020 in connection with International Patent Application No. PCT/KR2020/012436, 11 pages.

*Primary Examiner* — Mohammed Rachedine

(57) ABSTRACT

A method includes obtaining, using first and second image sensors of an electronic device, first and second images, respectively, of a scene. The method also includes obtaining, using an image depth sensor of the electronic device, a third image and a first depth map of the scene, the first depth map having a resolution lower than a resolution of the first and second images. The method further includes undistorting the first and second images using the third image and the first depth map. The method also includes rectifying the first and second images using the third image and the first depth map. The method further includes generating a disparity map using the first and second images that have been undistorted and rectified. In addition, the method includes generating a second depth map using the disparity map and the first depth map, where the second depth map has a resolution that is higher than the resolution of the first depth map.

20 Claims, 14 Drawing Sheets

(51) Int. Cl.
  *G06T 7/55*    (2017.01)
  *G06T 7/73*    (2017.01)
  *G06T 3/00*    (2006.01)
  *G06T 5/40*    (2006.01)
  *G06T 7/593*   (2017.01)

(52) U.S. Cl.
  CPC .................. *G06T 7/55* (2017.01); *G06T 7/74* (2017.01); *G06T 2207/10028* (2013.01); *G06T 2207/20016* (2013.01); *G06T 2207/30244* (2013.01)

(56)         References Cited

U.S. PATENT DOCUMENTS 9,442,363  B2      9/2016  Seo et al.
  9,906,721  B2      2/2018  Evans, V et al.
  2013/0077880 A1    3/2013  Venkataraman et al.
  2015/0066764 A1    3/2015  Crowell et al.
  2015/0085083 A1    3/2015  Chen et al.
  2015/0201176 A1    7/2015  Graziosi et al.
  2017/0366749 A1   12/2017  Zolotov
  2018/0139382 A1    5/2018  Venkataraman et al.
  2018/0249143 A1 *  8/2018  Calpe Maravilla ... G01S 7/4808
  2018/0307310 A1 * 10/2018  McCombe ........... H04N 13/243
  2019/0197667 A1 *  6/2019  Paluri .................... G06N 3/084
  2020/0242805 A1 *  7/2020  Deng ........................ G06T 7/73
  2020/0326775 A1 * 10/2020  Koo ...................... G02B 27/017
  2021/0096388 A1 *  4/2021  Hanover ................ G02B 27/64
  2021/0099639 A1 *  4/2021  Bartow ............. H04N 5/23206

FOREIGN PATENT DOCUMENTS

KR       10-2016-0107265 A      9/2016
  WO            2009/142332 A1   11/2009
  WO       WO-2013136333 A1 *     9/2013  ............. G06F 3/013
  WO       WO-2020184751 A  *     9/2020  ............. B25J 19/00

* cited by examiner $I_0$ $I_1$ $I_{ToF}$ $D_{ToF}$ $I_0$ $\hat{I}_{1R-OB}$

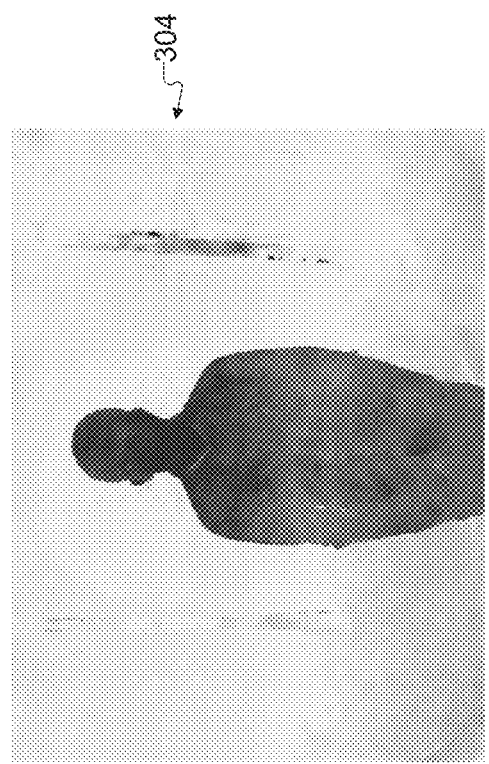
FIG. 3B
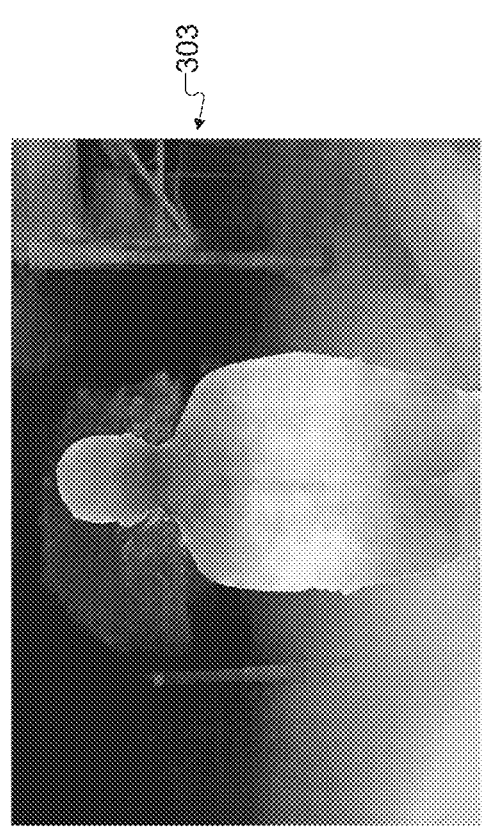
FIG. 3A

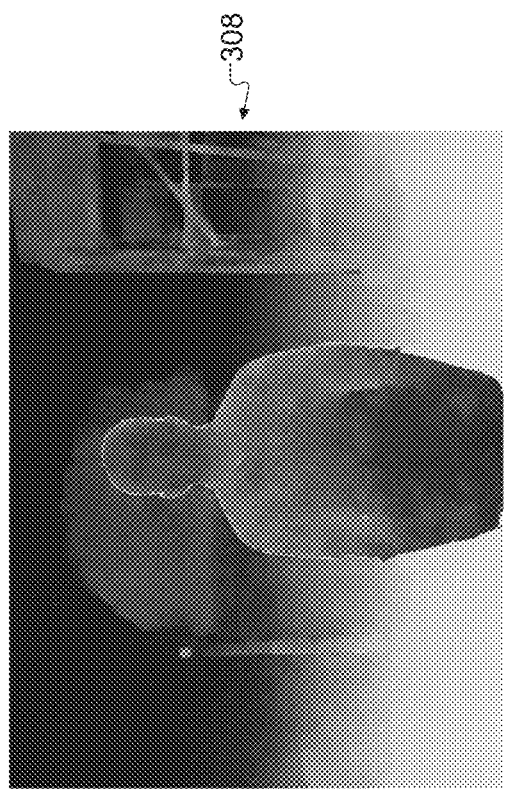
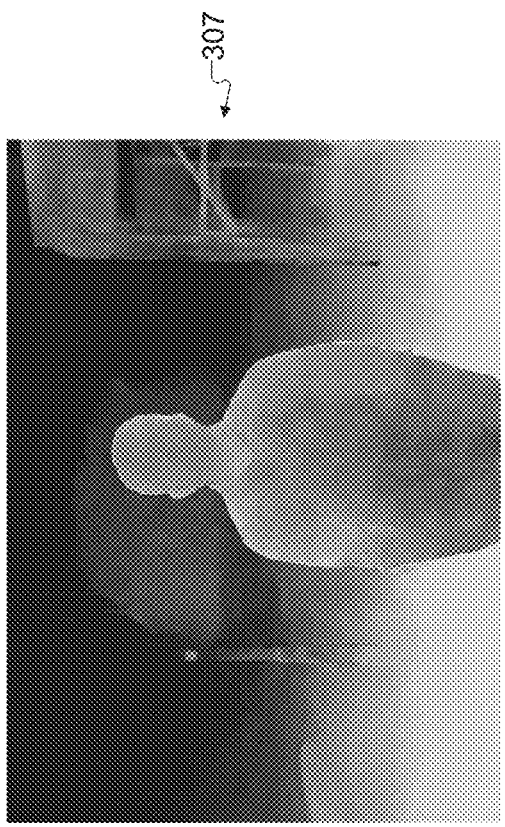
FIG. 3C
FIG. 3D

APPARATUS AND METHOD FOR DYNAMIC MULTI-CAMERA RECTIFICATION USING DEPTH CAMERA

TECHNICAL FIELD

This disclosure relates generally to image capturing systems. More specifically, this disclosure relates to an apparatus and method for dynamic multi-camera rectification using a depth camera.

BACKGROUND

Many mobile electronic devices, such as smartphones and tablet computers, include cameras that can be used to capture still and video images. While convenient, cameras on mobile electronic devices typically suffer from a number of shortcomings. For example, some cameras are not suitably equipped to handle challenges associated with multi-camera rectification. Multi-camera rectification is important in many applications that depend on depth map quality, such as live focus, augmented reality, autonomous driving, and the like. However, factory-provided calibration and rectification information for some cameras may not be helpful to these or other applications due to the existence of an optical imaging stabilization system, which results in a non-rigid baseline and unreliable depth estimation.

SUMMARY

This disclosure provides an apparatus and method for dynamic multi-camera rectification using a depth camera.

In a first embodiment, a method includes obtaining, using first and second image sensors of an electronic device, first and second images, respectively, of a scene. The method also includes obtaining, using an image depth sensor of the electronic device, a third image and a first depth map of the scene, the first depth map having a resolution lower than a resolution of the first and second images. The method further includes undistorting the first and second images using the third image and the first depth map. The method also includes rectifying the first and second images using the third image and the first depth map. The method further includes generating a disparity map using the first and second images that have been undistorted and rectified. In addition, the method includes generating a second depth map using the disparity map and the first depth map, where the second depth map has a resolution that is higher than the resolution of the first depth map.

In a second embodiment, an electronic device includes first and second image sensors, an image depth sensor, and at least one processing device. The first and second image sensors are configured to generate first and second images of a scene, respectively. The image depth sensor is configured to generate a third image and a first depth map of the scene, where the first depth map has a resolution lower than a resolution of the first and second images. The at least one processing device is configured to undistort the first and second images using the third image and the first depth map. The at least one processing device is also configured to rectify the first and second images using the third image and the first depth map. The at least one processing device is further configured to generate a disparity map using the first and second images that have been undistorted and rectified. In addition, the at least one processing device is configured to generate a second depth map using the disparity map and the first depth map, where the second depth map has a resolution that is higher than the resolution of the first depth map.

In a third embodiment, a non-transitory machine-readable medium contains instructions that when executed cause at least one processor of an electronic device to obtain first and second images of a scene that are captured using first and second image sensors, respectively, of the electronic device. The medium also contains instructions that when executed cause the at least one processor to obtain a third image and a first depth map of the scene that is captured using an image depth sensor of the electronic device, where the first depth map has a resolution lower than a resolution of the first and second images. The medium further contains instructions that when executed cause the at least one processor to undistort the first and second images using the third image and the first depth map. The medium also contains instructions that when executed cause the at least one processor to rectify the first and second images using the third image and the first depth map. The medium further contains instructions that when executed cause the at least one processor to generate a disparity map using the first and second images that have been undistorted and rectified. In addition, the medium contains instructions that when executed cause the at least one processor to generate a second depth map using the disparity map and the first depth map, where the second depth map has a resolution that is higher than the resolution of the first depth map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 3A through 3D illustrate an example comparison of depth map results obtained using different techniques including dynamic multi-camera rectification in accordance with this disclosure.

DETAILED DESCRIPTION

FIGS. 1 through 4, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, cameras in many mobile electronic devices suffer from a number of shortcomings. For example, some cameras are not suitably equipped to handle challenges associated with multi-camera rectification. Multi-camera rectification (sometimes referred to as multi-camera calibration) is important in many applications that depend on depth map quality, such as live focus, augmented reality, autonomous driving, and the like. However, factory-provided calibration and rectification information for some cameras may not be helpful to these or other applications due to the existence of an optical imaging stabilization system, which results in a non-rigid baseline and unreliable depth estimation. In general, dynamic multi-camera rectification uses a metric ground truth, meaning knowledge of one or more predetermined reference points. Some multi-calibration techniques use patterns with a known geometry (such as a checkerboard pattern) or three-dimensional (3D) objects with known math models. These dynamic calibration techniques use only sparse image feature points at a similar distance and are not able to generate a reliable result when the background feature points are close to the camera.

To address these and other issues, this disclosure provides various techniques for dynamic multi-camera rectification. The disclosed embodiments combine a depth sensor and a multi-camera system, which are quickly becoming more common on many electronic devices, to achieve an accurate, high-resolution depth map. In some embodiments, a high-resolution depth map is generated using image data captured from multiple red green blue (RGB) cameras and at least one depth camera or other depth sensor. The depth sensor is able to generate a depth map corresponding to depths within the scene. Typically, the depth map resolution from the depth sensor is low. However, a disparity map generated using image data from the multiple RGB cameras has high resolution and high quality. The disclosed embodiments combine the high-resolution high-quality disparity map and the low-resolution depth map to generate a high-resolution depth map. The high-resolution depth map can then be used in a wide variety of image applications, such as live focus, augmented reality, or autonomous driving.

Figure 1:
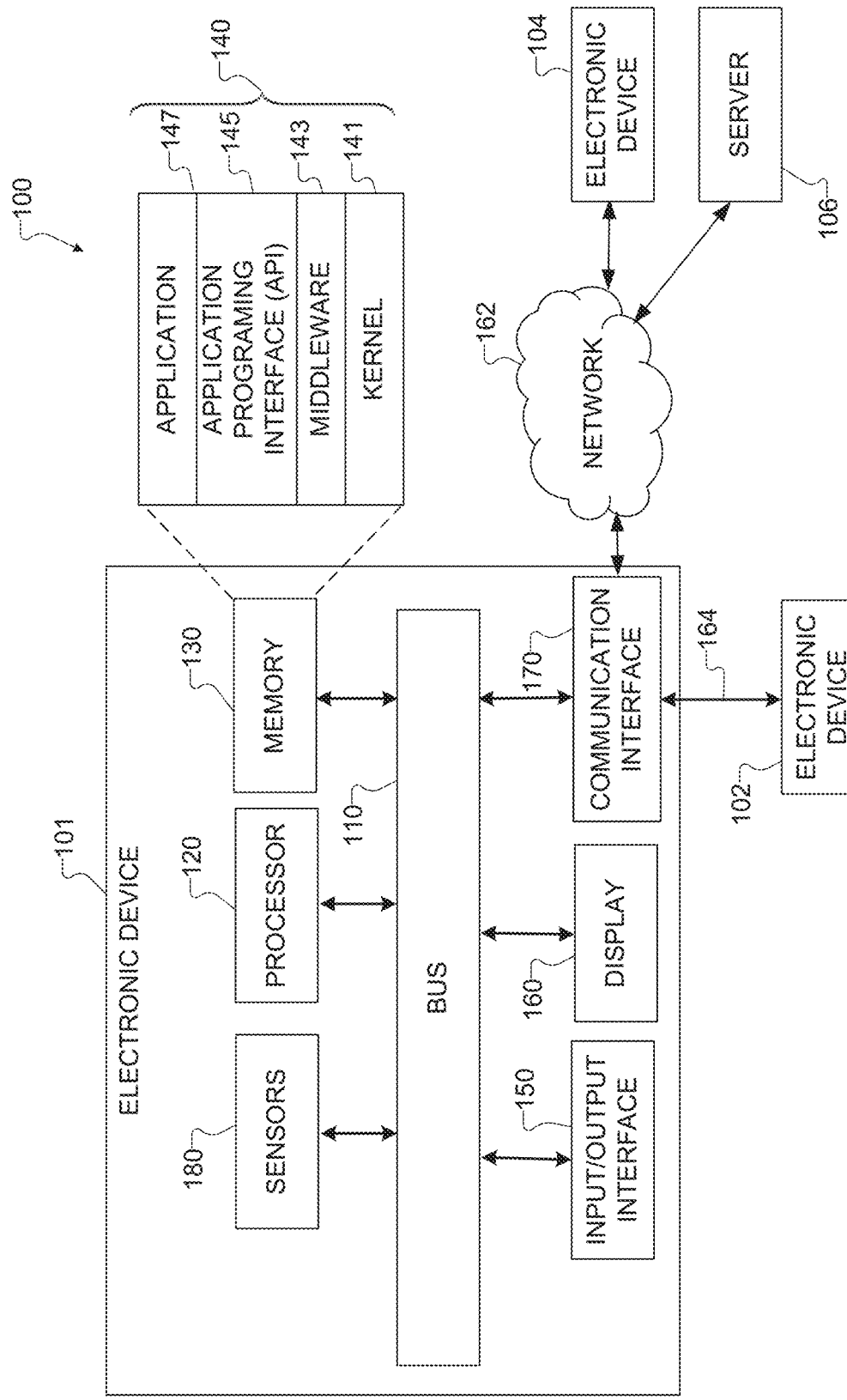
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera and process the image data (as discussed in more detail below) to perform dynamic multi-camera rectification.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
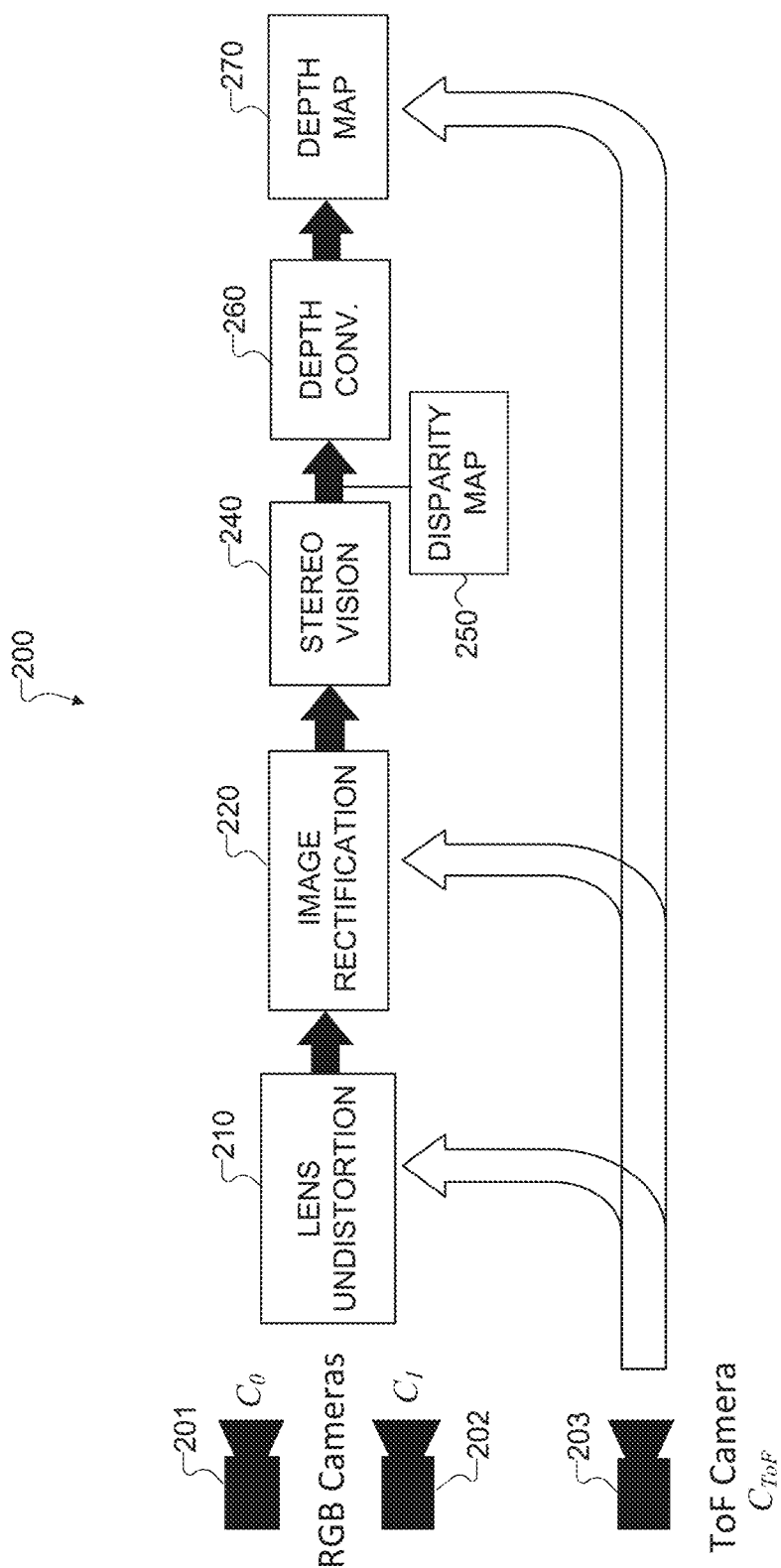
FIGS. 2A through 2O illustrate an example process for dynamic multi-camera rectification using a depth camera in accordance with this disclosure.
Figure 2B:
Figure 2C:
Figure 2D:
Figure 2E:
Figure 2F:
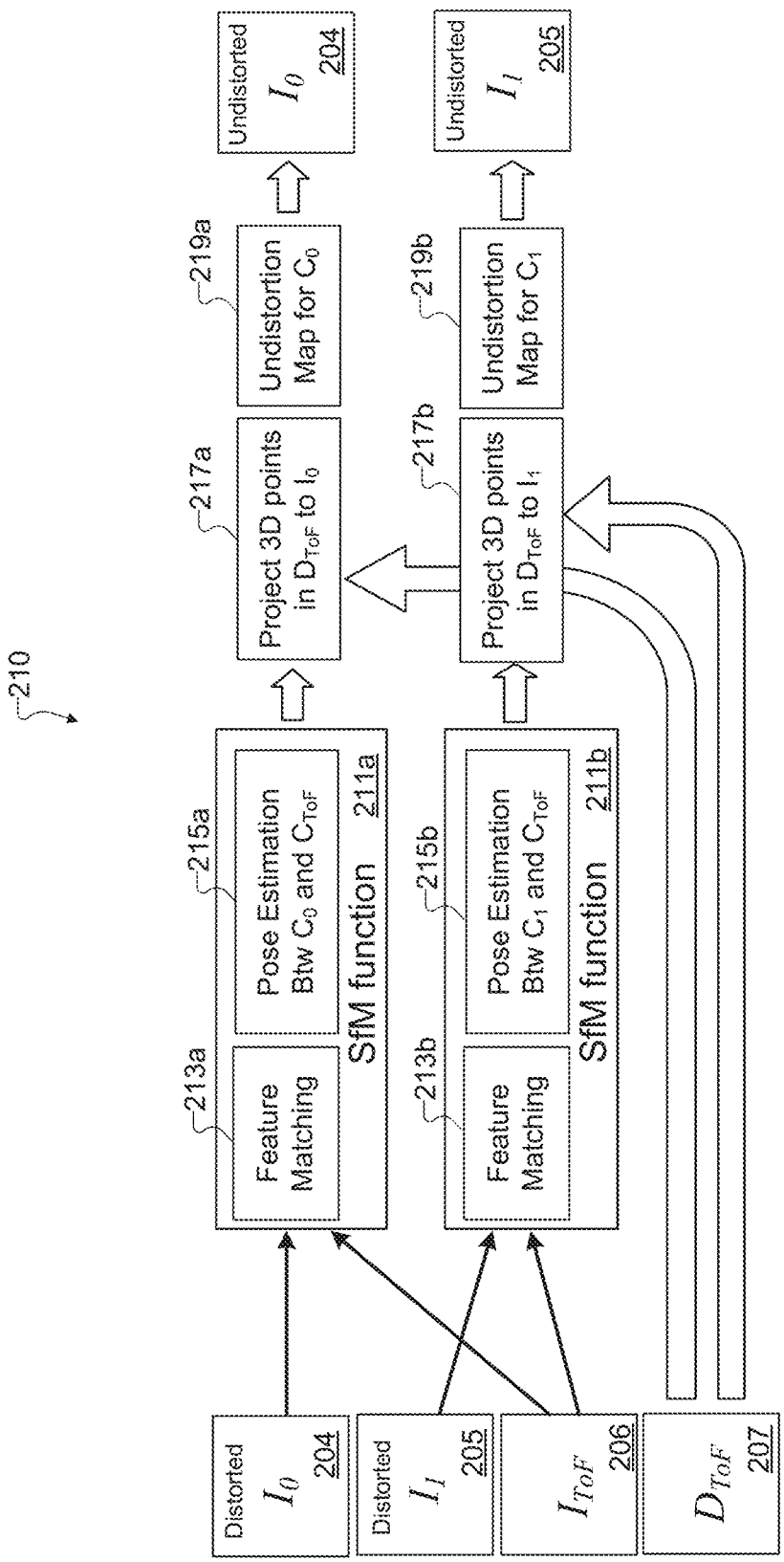
Figure 2G:
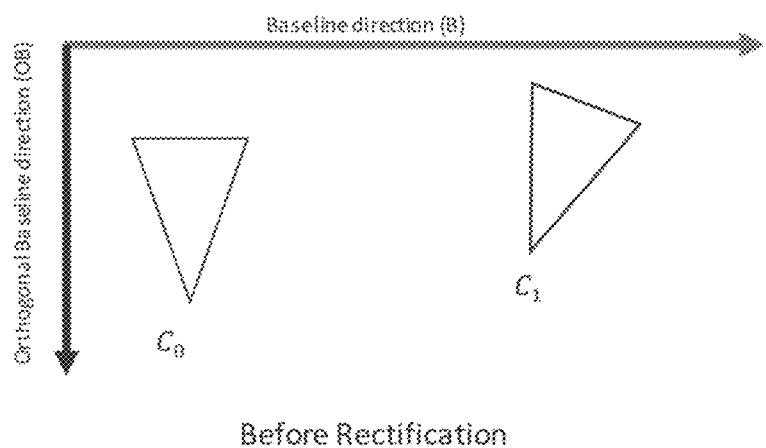
Figure 2H:
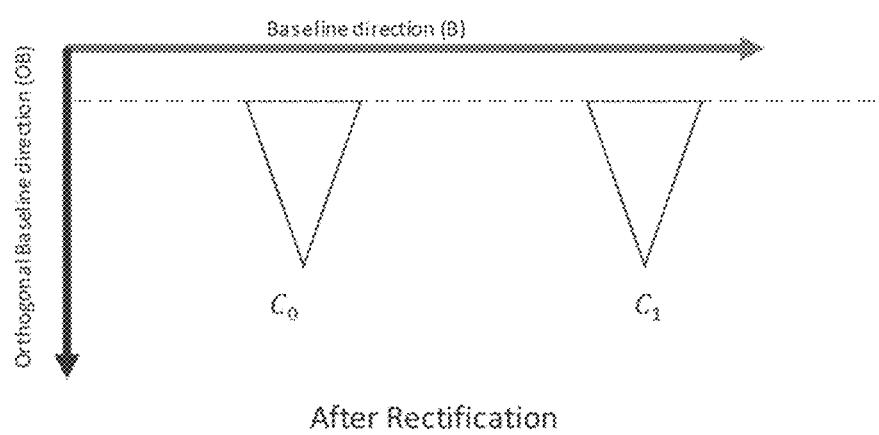
Figure 21:
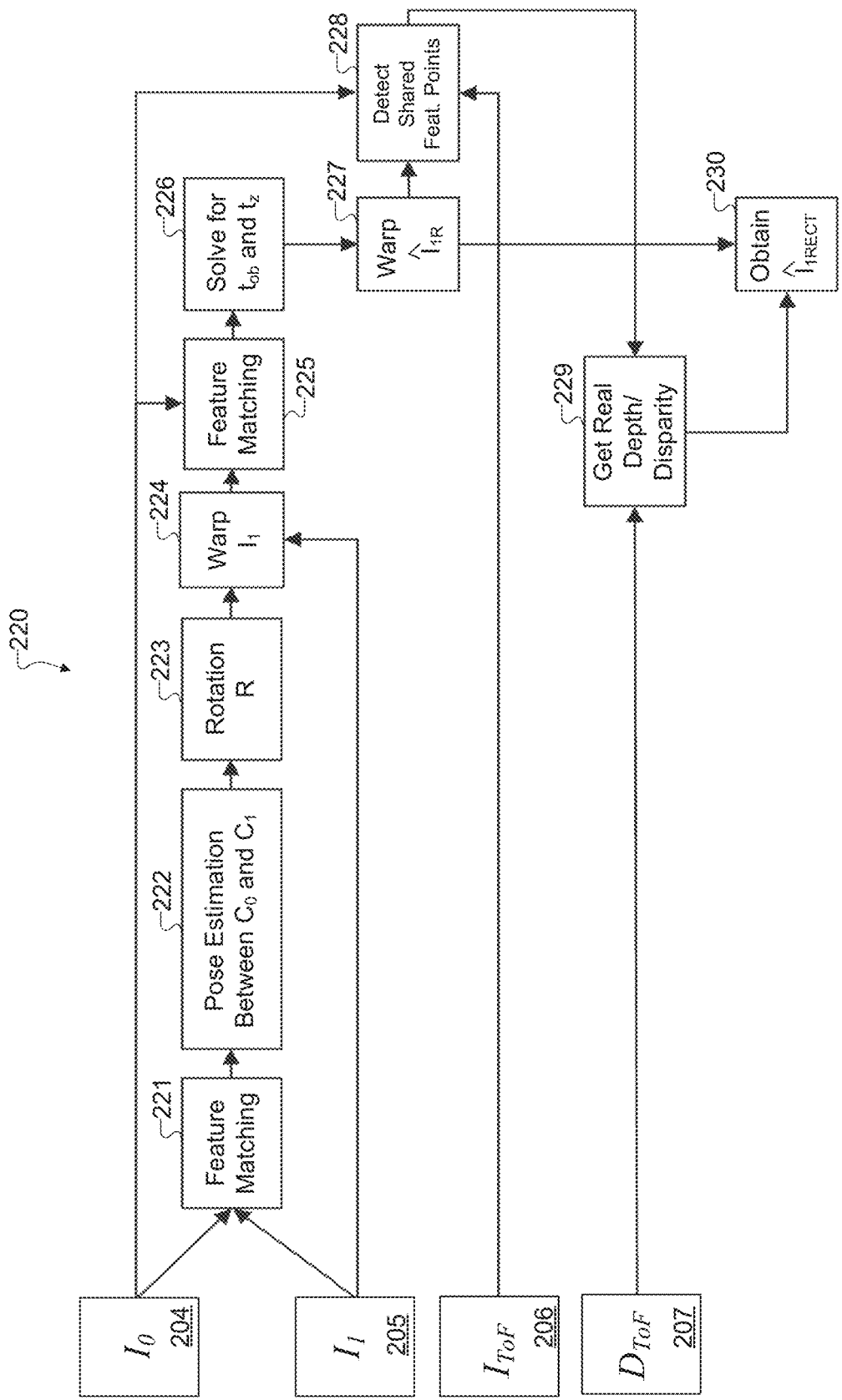
Figure 2J:
Figure 2K:
Figure 2L:
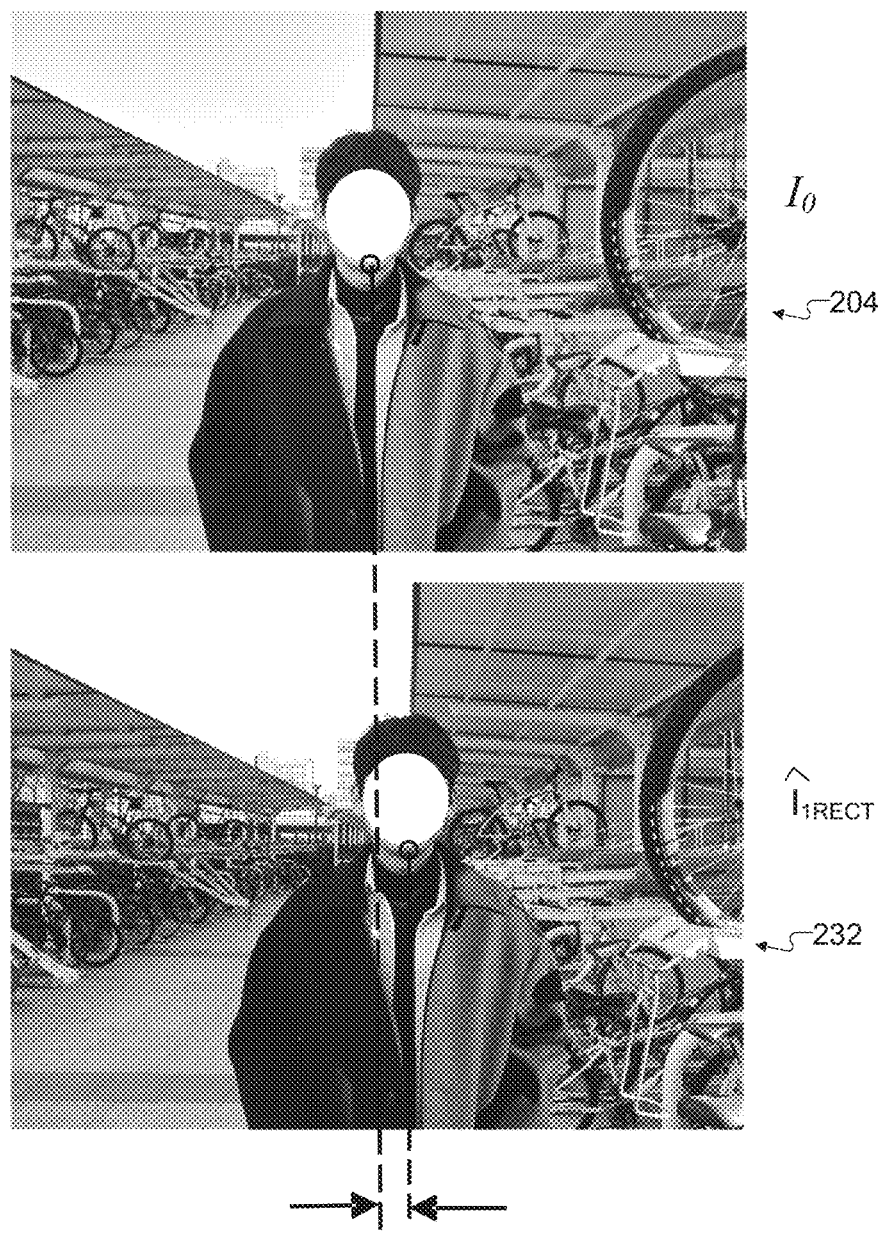
Figure 2N:
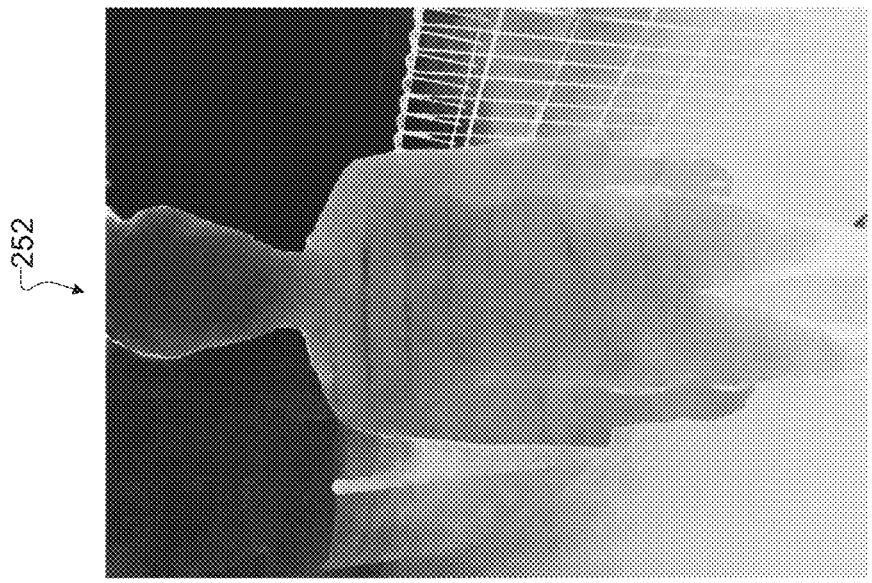
Figure 2M:
Figure 2O:
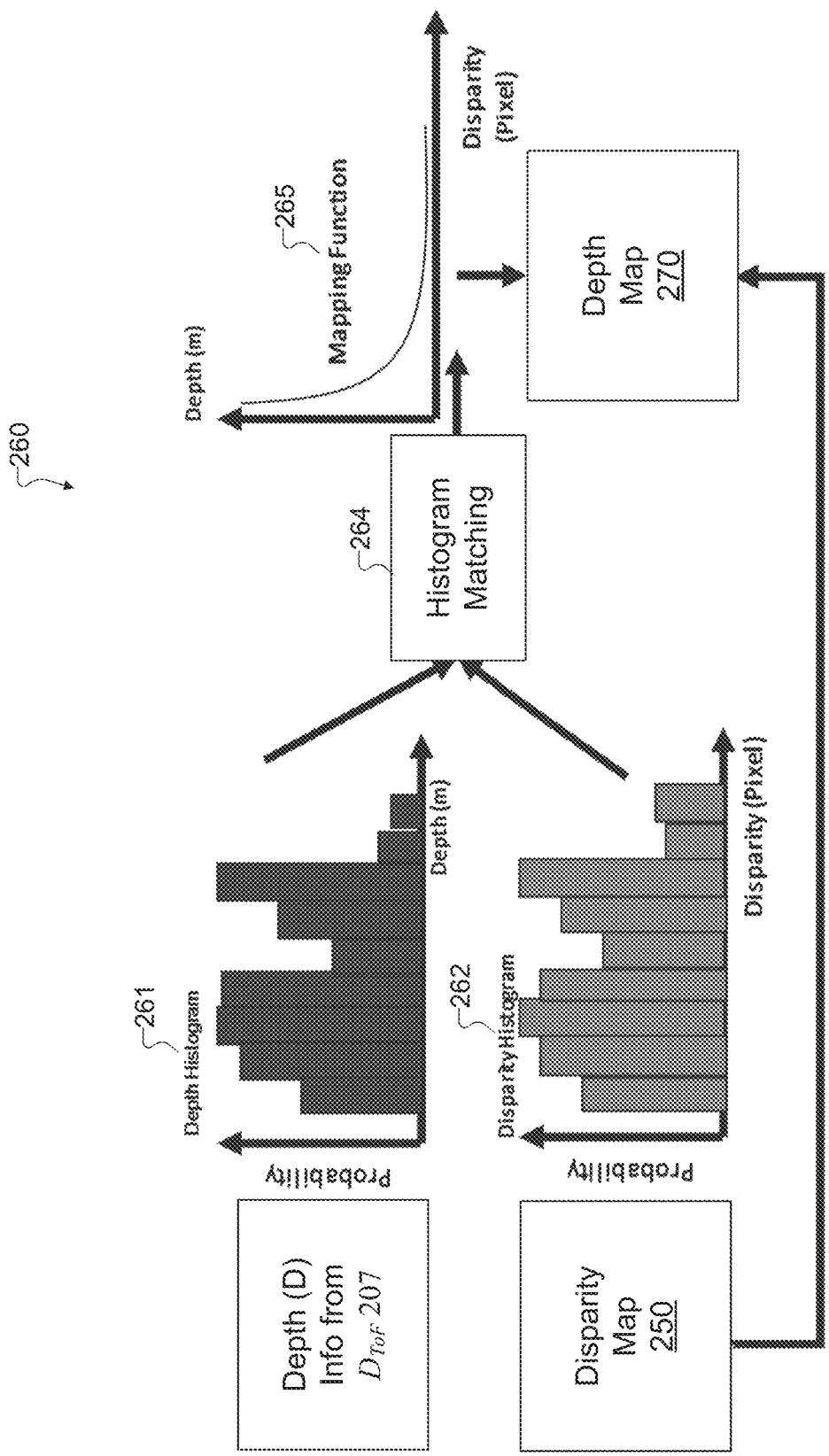

FIGS. 2A through 2O illustrate an example process 200 for dynamic multi-camera rectification using a depth camera in accordance with this disclosure. For ease of explanation, the process 200 shown in FIGS. 2A through 2O is described as being performed using the electronic device 101 shown in FIG. 1. However, the process 200 could be used with any other suitable electronic device and in any suitable system.

As shown in FIG. 2A, the electronic device 101 includes multiple RGB cameras 201 and 202 and a time-of-flight (ToF) camera 203. In some embodiments, the camera 203 represents a depth camera that determines a depth of subject matter in a scene using one or more time-of-flight techniques. The camera 203 can also be a depth sensor or any other suitable system or structure configured to detect and measure depth in image processing. While the process 200 is described as including an electronic device 101 with two RGB cameras and one time-of-flight camera, this is merely one example. Electronic devices with more than two RGB cameras or more than one time-of-flight camera can be used and are within the scope of this disclosure. Also, while described as using RGB cameras, other types of image sensors may be used.

In response to an event, such as a user actuating a shutter control, the cameras 201, 202, and 203 capture images of a scene at approximately the same moment. As shown in FIGS. 2B and 2C, the camera 201 captures an image 204 (denoted $I_0$), and the camera 202 captures an image 205 (denoted $I_1$). In the images 204 and 205 (and in other images of this disclosure), the person's face is obscured for privacy. The images 204 and 205 are RGB images that generally capture the same scene, but the images 204 and 205 appear to be from different distances or slightly-different angles. This may occur, for instance, when the cameras 201 and 202 are different types of cameras, such as when one camera has a wider field of view. As shown in FIGS. 2D and 2E, the camera 203 captures a ToF image 206 (denoted $I_{ToF}$) and generates a depth map 207 (denoted $D_{ToF}$). In some embodiments, the image 206 can be a black and white image with less detail than either image 204 or 205. Also, in some embodiments, the depth map 207 has the appearance of a gray scale, low-resolution image, where different levels of gray represent different depths.

While not explicitly shown in FIGS. 2B and 2C, the images 204 and 205 typically include certain amounts of distortion. For example, when a camera captures an image, an otherwise rectilinear image may be distorted by the optical lens of the camera, such as by having a rounded or "barrel shape" appearance. To correct the distortion, the electronic device 101 performs a lens undistortion function 210. Using the lens undistortion function 210, the electronic device 101 can undistort the images 204 and 205 using the image 206 and the depth map 207 from the camera 203.

FIG. 2F illustrates one example implementation of the lens undistortion function 210 in greater detail. As shown in FIG. 2F, the electronic device 101 provides the distorted image 204 and the image 206 as inputs to a Structure from Motion (SfM) function 211a. Similarly, the electronic device 101 provides the distorted image 205 and the image 206 as inputs to a second SfM function 211b. Structure from Motion is an imaging technique for estimating a three-dimensional structure of a scene from a set of two-dimensional images. While FIG. 2F shows two SfM functions 211a-211b, this is merely one example. In other embodiments, the electronic device 101 may perform more than two SfM functions, such as when the electronic device 101 includes more than two RGB cameras. Also, in other embodiments, the electronic device 101 may perform a single SfM function multiple times with different inputs.

Each SfM function 211a-211b includes a feature matching function 213a-213b and a pose estimation function 215a-215b. The electronic device 101 performs the feature matching function 213a to detect and match a list of sparse feature points (denoted $p_{ToF}^0$) that are shared between the image 204 and the image 206. Similarly, the electronic device 101 performs the feature matching function 213b to detect and match a list of sparse feature points (denoted $p_{ToF}^1$) that are shared between the image 205 and the image 206. The feature points can be part of an identifiable element in an image. For example, in the images 204, 205, and 206 shown in FIGS. 2B through 2D, some of the feature points may be part of a person's nose. The feature matching functions 213a-213b represent any suitable algorithm or function configured to match features between images.

Once the matched feature points $p_{ToF}^0$ and $p_{ToF}^1$ have been identified, the electronic device 101 uses the matched feature points to perform the pose estimation functions 215a-215b. The electronic device 101 performs the pose estimation function 215a to determine the pose between the camera 201 and the camera 203. Similarly, the electronic device 101 performs the pose estimation function 215b to determine the pose between the camera 202 and the camera 203. In some embodiments, the pose between two cameras includes a rotational difference, a translational difference, or both. In particular embodiments, the actual rotational difference value can be determined, and a scale value for translation may be determined when an actual translational distance cannot be determined. Here, the pose estimation functions 215a-215b represent any suitable algorithm or function configured to determine a pose between multiple cameras.

After the electronic device 101 completes the SfM functions 211a-211b, the electronic device 101 performs projection functions 217a-217b. The electronic device 101 performs the projection function 217a by looking up the 3D coordinates (corresponding to the X, Y, and Z axes) for each matched feature point $p_{ToF}^0$ on the depth map 207 and projecting the feature points back onto the image plane of the camera 201 (where the projected feature points are denoted $\hat{p}_{ToF}^0$). Similarly, the electronic device 101 performs the projection function 217b by looking up the 3D coordinates for each matched feature point $p_{ToF}^1$ on the depth map 207 and projecting the feature points back onto the image plane of the camera 202 (where the projected feature points are denoted $\hat{p}_{ToF}^1$). Here, the projection functions 217a-217b represent any suitable algorithm or function configured to project 3D coordinates onto a 2D image.

After performing the projection functions 217a-217b, the electronic device 101 generates undistortion maps 219a-219b for the camera 201 and the camera 202, respectively. The electronic device 101 generates the undistortion map 219a for the camera 201 based on the differences between the projected feature points $\hat{p}_{ToF}^0$ and the actual feature points $p_{ToF}^0$. Similarly, the electronic device 101 generates the undistortion map 219b for the camera 202 based on the differences between the projected feature points $\hat{p}_{ToF}^1$ and the actual feature points $p_{ToF}^1$. A difference can be determined for each of the identified feature point. Once the undistortion maps 219a-219b are generated, the electronic device 101 can determine the undistorted versions of the images 204 and 205 using the undistortion maps 219a-219b. This can include shifting the coordinates of each point in the images 204 and 205 using the corresponding undistortion map 219a-219b, respectively.

Turning again to FIG. 2A, after completion of the lens undistortion function 210, the electronic device 101 performs an image rectification function 220. The purpose of image rectification in general is to rotate and/or translate one or more images from multiple cameras to bring the images onto one common plane so that any remaining disparity is only along the baseline direction. This compensates for the disparity in image planes between the cameras. For example, as illustrated in FIG. 2G, two cameras $C_0$ and $C_1$ have image planes that differ in angle and in position along an orthogonal baseline (OB). Image rectification can be performed so that it appears that the optical axes of the cameras $C_0$ and $C_1$ are rotationally aligned and have the same baseline (such as the disparity on the OB is zero) as shown in FIG. 2H. The remaining disparity is only along the baseline direction.

FIG. 2I illustrates one example implementation of the image rectification function 220 in greater detail. As shown in FIG. 2I, the electronic device 101 takes the undistorted versions of the images 204 and 205 and performs a feature matching function 221 to detect and match a list of sparse feature points that are shared between the images 204 and 205. The feature matching function 221 can be the same as or similar to the feature matching functions 213a-213b described above with respect to FIG. 2F.

Once the matched feature points between the images 204 and 205 have been identified, the electronic device 101 uses the matched feature points to perform a pose estimation function 222. By performing the pose estimation function 222, the electronic device 101 determines the pose between the cameras 201 and 202. One part of the pose is a rotation matrix 223 (denoted R), which represents the rotation between the cameras 201 and 202. Another part of the pose is the translation, which can be determined up to a scale. In some embodiments, a translation vector representing the translation can be expressed as:

$$T = [t_{ob}, t_b, t_z]^T \quad (1)$$

where $t_{ob}$ is the translation along the orthogonal baseline direction, $t_b$ is the translation along the baseline, and $t_z$ is the translation along the optical axis.

Using a warping operation 224, the electronic device 101 warps the image 205 so that there is no relative rotation between the cameras 201 and 202. In some embodiments, the operation of the warping function 224 can be expressed as:

$$\hat{I}_{1R}K^{-1} = I_1 K^{-1} R \quad (2)$$

where $\hat{I}_{1R}$ is the warped image $I_1$, K is the predetermined intrinsic matrix for the camera 202, and R is the rotation matrix 223. After warping the image 205, the electronic device 101 takes the undistorted image 204 and the warped image 205 and performs another feature matching function 225. The electronic device 101 performs the feature matching function 225 to determine the shared sparse feature point lists (denoted $p_0$ and $p_1$).

Using operation 226, the electronic device 101 minimizes the disparity on the OB direction. In some embodiments, this can be accomplished by solving the following linear equation:

$$[t_{ob}, 1, t_z]^T + p_0^{ob} K^{-1} = p_1^{ob} K^{-1} \quad (3)$$

where $t_{ob}$ and $t_z$ are unknowns to be solved. Here, $t_{ob}$ and $t_z$ represent translations between the undistorted image 204 and the warped image 205.

Using a warping operation 227, the electronic device 101 warps the image $\hat{I}_{1R}$ using the solved $t_{ob}$ and $t_z$ from operation 226 to obtain an image 231 (denoted $\hat{I}_{1R-OB}$). FIGS. 2J and 2K illustrate a comparison between the original image 204 and the image 231. As shown in FIGS. 2J and 2K, there is greater similarity between the images 204 and 231, as compared to the original images 204 and 205 shown in FIGS. 2B and 2C.

At this point, the electronic device 101 can perform operations to align the disparity along the baseline direction. Using operation 228, the electronic device 101 detects shared feature points between the images 204, 231, and 206. Using operation 229, for any shared feature point, the electronic device 101 looks up the real depth of the feature point from the depth map 207 and converts it to a disparity value (denoted $d_{ToF}$). Using operation 230, the electronic device 101 re-warps the image $\hat{I}_{1R}$ (by warping the image 231) and obtains a final rectification result image 232 (denoted $\hat{I}_{1RECT}$) such that the disparity of the matched features between the image 204 and the image 232 is equivalent to $d_{ToF}$.

FIG. 2L shows a comparison between the image 204 and the image 232. As shown in FIG. 2L, the image 204 and the image 232 appear to be angularly aligned and captured from a similar distance. However, the image 204 and the image 232 exhibit an amount of translational disparity. For example, a feature shared between the two images 204 and 232 is the subject's chin. The translational disparity between the shared features (such as the distance indicated by the arrows in FIG. 2L) is the same as the real disparity $d_{ToF}$.

Turning again to FIG. 2A, after completion of the image rectification function 220, the electronic device 101 performs a stereo vision function 240. In the stereo vision function 240, the electronic device 101 receives two undistorted and rectified images from the image rectification function 220 and executes a stereo vision algorithm to generate a disparity map 250. In some embodiments, the disparity map represents a map, table, or list of the translational disparity, or difference in location, between multiple feature points of one image and the corresponding feature points of another image. While a disparity map can indicate disparity between points in the baseline direction, the orthogonal baseline direction, or both, the disparity map generally does not explicitly list any depth information (although, as described below, depth information can be determined from the disparity information in the disparity map using known relationships between depth and disparity). In the process 200, the disparity map 250 can indicate a difference in location between the sparse feature points in the image 204 and the corresponding sparse feature points in the image 205.

A depth map 270 is generated from the disparity map 250 based on the known relationship between disparity and depth. In general, the depth (D) and disparity (d) of a feature point are inversely related, which can be expressed according to the following equation:

$$\text{Depth}(D) = k * \frac{\text{Length of Baseline } (btw \text{ cameras}) \times \text{Focal Length(of cameras)}}{\text{Disparity } (d)} \quad (4)$$

While Equation (4) could be used to trivially determine depth from disparity in cameras with a fixed location, it is not accurate when the cameras or their lenses are capable of movement. In many electronic devices, the lenses associated with the cameras are flexibly mounted and are subject to translational or rotational movement relative to each other. For example, in an electronic device 101, lenses for one or more of the cameras 201-203 can be flexibly mounted, such as with one or more springs. In these types of electronic devices 101, a disparity map can be useful in determining depth.

FIG. 2M illustrates an image 251 of a scene, and FIG. 2N illustrates a disparity map image 252 that is a visualization of a disparity map 250 corresponding to the image 251. In the disparity map image 252, the different shades correspond to different amounts of disparity between the image 251 and a second image (not shown). The amounts of disparity are indicated in the disparity map 250, which can be represented visually as the disparity map image 252.

FIG. 2O illustrates one example implementation of the depth map conversion process 260 in greater detail, which can be used to convert a disparity map into a depth map. As shown in FIG. 2O, the electronic device 101 generates a depth histogram 261 based on the depth information in the depth map 207. Similarly, the electronic device 101 generates a disparity histogram 262 based on the disparity information in the disparity map 250. The electronic device 101 compares and matches the depth histogram 261 and the disparity histogram 262 using a histogram matching algorithm 264 to generate a mapping function 265. Here, the histogram matching algorithm 264 represents any suitable algorithm or function configured to use multiple histograms to generate a mapping function. The mapping function 265 is an inverse relationship between depth (D) and disparity (d) that is similar in principle to the function of Equation (4) above. Once the mapping function 265 is generated, the electronic device 101 can use the mapping function 265 to generate a high-resolution depth map 270 from the high-resolution disparity map 250. In some embodiments, the high-resolution depth map 270 can have a resolution that is the same as or similar to the images 204 and 205.

It should be noted that the operations and functions shown in FIGS. 2A through 2O can be implemented in an electronic device 101 in any suitable manner. For example, in some embodiments, the operations shown in FIGS. 2A through 2O can be implemented or supported using one or more software applications or other software instructions that are executed by the processor 120 of the electronic device 101. In other embodiments, at least some of the operations shown in FIGS. 2A through 2O can be implemented or supported using dedicated hardware components. In general, the operations shown in FIGS. 2A through 2O can be performed using any suitable hardware or any suitable combination of hardware and software/firmware instructions.

Although FIGS. 2A through 2O illustrate one example of a process 200 for dynamic multi-camera rectification using a depth camera, various changes may be made to FIGS. 2A through 2O. For example, while shown as a specific sequence of operations, various operations shown in FIGS. 2A through 2O could overlap, occur in parallel, occur in a different order, or occur any number of times. Also, the specific operations shown in FIGS. 2A through 2O are examples only, and other techniques could be used to perform each of the operations shown in FIGS. 2A through 2O.

FIGS. 3A through 3D illustrate an example comparison of depth map results obtained using different techniques including dynamic multi-camera rectification in accordance with this disclosure. FIG. 3A shows an image 301 and a depth map 303 corresponding to the image 301, and FIG. 3B shows a second image 302 and a depth map 304 corresponding to the image 302. The images 301-302 and the depth maps 303-304 may be generated using conventional techniques for depth analysis, such as techniques used by an electronic device that does not include a depth camera or depth sensor. While the images 301-302 are similar, the corresponding depth maps 303-304 are quite different as indicated by the different shadings. The lack of consistency between the depth maps 303-304 can cause difficulty or unsuitable results for applications that rely on depth maps, such as live focus, augmented reality, autonomous driving, and the like.

In contrast, FIG. 3C shows an image 305 and a depth map 307 corresponding to the image 305, and FIG. 3D shows a second image 306 and a depth map 308 corresponding to the image 306. In this case, the images 305-306 and the depth maps 307-308 were generated using the process 200 described above. As can be seen here, the depth maps 307-308 are much more consistent, which provides better results for applications that use depth maps.

Although FIGS. 3A through 3D illustrate one example of a comparison of depth map results obtained using different techniques including dynamic multi-camera rectification, various changes may be made to FIGS. 3A through 3D. For example, since the images that are captured and process can vary widely, and the images shown in FIGS. 3A through 3D are for illustration only.

Figure 4:
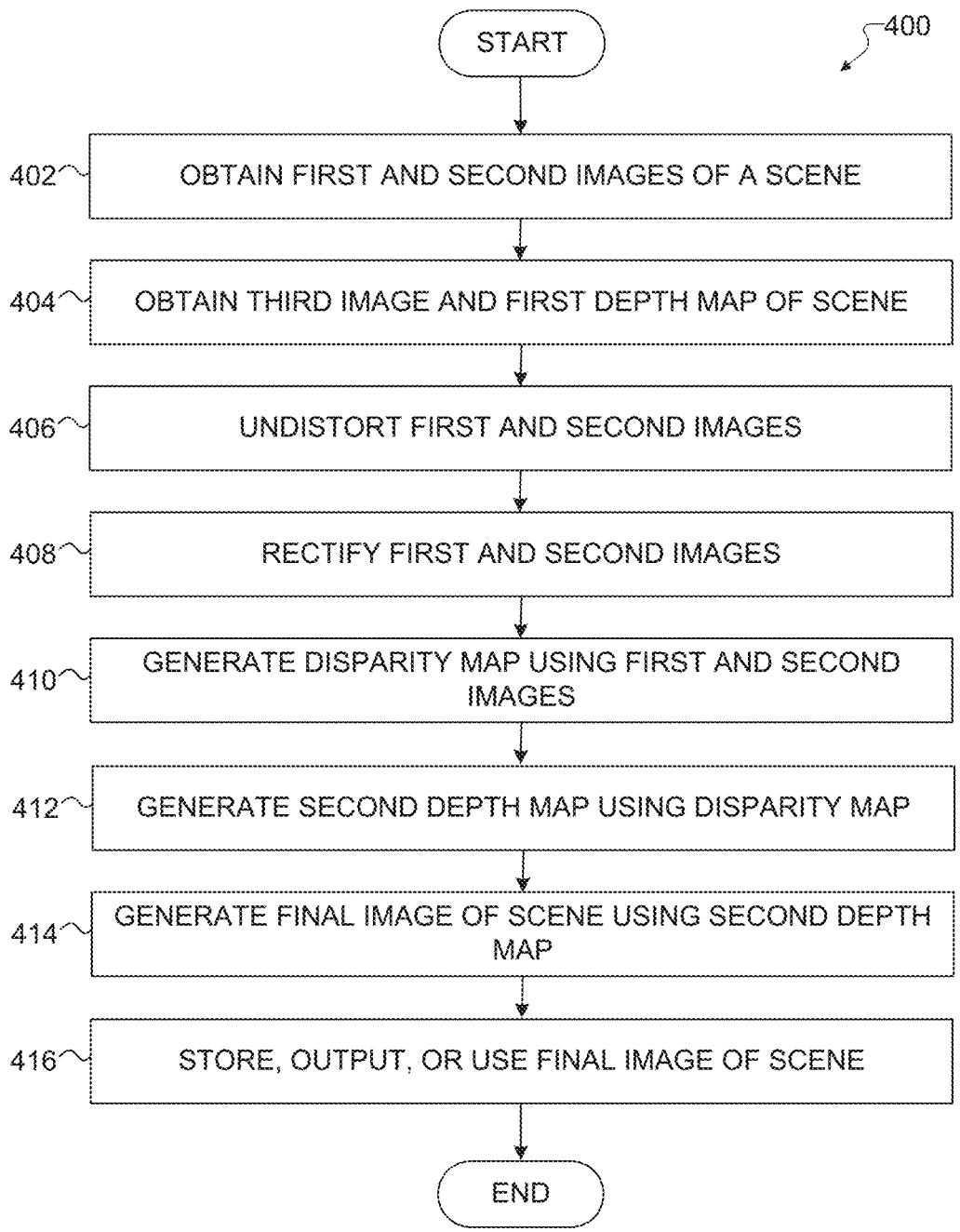
FIG. 4 illustrates an example method for dynamic multi-camera rectification using a depth camera in accordance with this disclosure.

FIG. 4 illustrates an example method 400 for dynamic multi-camera rectification using a depth camera in accordance with this disclosure. For ease of explanation, the method 400 shown in FIG. 4 is described as involving the performance of the process 200 shown in FIGS. 2A through 2O using the electronic device 101 shown in FIG. 1. However, the method 400 shown in FIG. 4 could be used with any other suitable electronic device and in any suitable system.

As shown in FIG. 4, first and second images of a scene are obtained using first and second image sensors, respectively, of an electronic device at step 402. This could include, for example, the camera 201 capturing the image 204 and the camera 202 capturing the image 205. A third image and a first depth map of the scene are obtained using an image depth sensor of the electronic device at step 404. The first depth map has a resolution lower than a resolution of the first and second images. This could include, for example, the camera 203 capturing the ToF image 206 and generating the depth map 207.

The first and second images are undistorted using the third image and the first depth map at step 406. This could include, for example, the processor 120 of the electronic device 101 performing the lens undistortion function 210 to undistort the images 204 and 205 using the image 206 and the depth map 207. The first and second images are rectified using the third image and the first depth map at step 408. This could include, for example, the processor 120 of the electronic device 101 performing the image rectification function 220 to rectify the images 204 and 205 using the image 206 and the depth map 207.

A disparity map is generated using the first and second images that have been undistorted and rectified at step 410. This could include, for example, the processor 120 of the electronic device 101 generating the disparity map 250 using the undistorted and rectified versions of the images 204 and 205. A second depth map is generated using the disparity map and the first depth map at step 412. The second depth map has a resolution that is higher than the resolution of the first depth map. This could include, for example, the processor 120 of the electronic device 101 generating the high-resolution depth map 270 using the disparity map 250 and the depth map 207.

A final image of the scene can be generated using the second depth map and at least one of the first and second images at step 414. This could include, for example, the processor 120 of the electronic device 101 generating a final image from the images 204 and 205 based on the values contained in the depth map 270. The final image of the scene could be generated according to an application that uses a depth map, such as a live focus application, augmented reality application, or autonomous driving application. Note that any other desired image processing operations may also occur here to produce the final image of the scene.

The final image of the scene can be stored, output, or used in some manner at step 416. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 4 illustrates one example of a method 400 for dynamic multi-camera rectification using a depth camera, various changes may be made to FIG. 4. For example, while shown as a series of steps, various steps in FIG. 4 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining, using first and second image sensors of an electronic device, first and second images, respectively, of a scene;
obtaining, using an image depth sensor of the electronic device, a third image and a first depth map of the scene, the first depth map having a resolution lower than a resolution of the first and second images;
undistorting the first and second images using the third image and the first depth map;
rectifying the first and second images using the third image and the first depth map;
generating a disparity map using the first and second images that have been undistorted and rectified; and
generating a second depth map using the disparity map and the first depth map, the second depth map having a resolution that is higher than the resolution of the first depth map.

2. The method of claim 1, further comprising:
generating a final image of the scene using the second depth map and at least one of the first and second images.

3. The method of claim 1, wherein undistorting the first and second images comprises:
matching multiple feature points in common between the first and third images and between the second and third images;
estimating a first pose between the first image sensor and the image depth sensor and a second pose between the second image sensor and the image depth sensor using the matched feature points;
projecting the matched feature points onto an image plane using the first depth map;
generating an undistortion map for each of the first and second images using the projected feature points; and
undistorting each of the first and second images using the corresponding undistortion map.

4. The method of claim 1, wherein rectifying the first and second images comprises:
matching multiple feature points in common between the first and second images;
estimating a pose between the first image sensor and the second image sensor using the matched feature points; and
warping at least one of the first and second images.

5. The method of claim 1, wherein generating the second depth map using the disparity map comprises:
generating a depth histogram using the first depth map;
generating a disparity histogram using the disparity map;
generating a mapping function based on a comparison of the depth histogram and the disparity histogram; and
generating the second depth map using the mapping function.

6. The method of claim 1, wherein the resolution of the second depth map is substantially equal to the resolution of the first and second images.

7. The method of claim 1, wherein the image depth sensor comprises a time-of-flight (ToF) camera.

8. An electronic device comprising:
first and second image sensors configured to generate first and second images of a scene, respectively;
an image depth sensor configured to generate a third image and a first depth map of the scene, the first depth map having a resolution lower than a resolution of the first and second images; and
at least one processing device configured to:
undistort the first and second images using the third image and the first depth map;
rectify the first and second images using the third image and the first depth map;
generate a disparity map using the first and second images which have been undistorted and rectified; and
generate a second depth map using the disparity map and the first depth map, the second depth map having a resolution that is higher than the resolution of the first depth map.

9. The electronic device of claim 8, wherein the at least one processing device is further configured to generate a final image of the scene using the second depth map and at least one of the first and second images.

10. The electronic device of claim 8, wherein, to undistort the first and second images, the at least one processing device is configured to:
- match multiple feature points in common between the first and third images and between the second and third images;
- estimate a first pose between the first image sensor and the image depth sensor and a second pose between the second image sensor and the image depth sensor using the matched feature points;
- project the matched feature points onto an image plane using the first depth map;
- generate an undistortion map for each of the first and second images using the projected feature points; and
- undistort each of the first and second images using the corresponding undistortion map.

11. The electronic device of claim 8, wherein, to rectify the first and second images, the at least one processing device is configured to:
- match multiple feature points in common between the first and second images;
- estimate a pose between the first image sensor and the second image sensor using the matched feature points; and
- warp at least one of the first and second images.

12. The electronic device of claim 8, wherein, to generate the second depth map using the disparity map, the at least one processing device is configured to:
- generate a depth histogram using the first depth map;
- generate a disparity histogram using the disparity map;
- generate a mapping function based on a comparison of the depth histogram and the disparity histogram; and
- generate the second depth map using the mapping function.

13. The electronic device of claim 8, wherein the resolution of the second depth map is substantially equal to the resolution of the first and second images.

14. The electronic device of claim 8, wherein the image depth sensor comprises a time-of-flight (ToF) camera.

15. A non-transitory machine-readable medium containing instructions that when executed cause at least one processor of an electronic device to:
- obtain first and second images of a scene that are captured using first and second image sensors, respectively, of the electronic device;
- obtain a third image and a first depth map of the scene that are captured using an image depth sensor of the electronic device, the first depth map having a resolution lower than a resolution of the first and second images;
- undistort the first and second images using the third image and the first depth map;
- rectify the first and second images using the third image and the first depth map;
- generate a disparity map using the first and second images which have been undistorted and rectified; and
- generate a second depth map using the disparity map and the first depth map, the second depth map having a resolution that is higher than the resolution of the first depth map.

16. The non-transitory machine-readable medium of claim 15, further containing instructions that when executed cause the at least one processor to generate a final image of the scene using the second depth map and at least one of the first and second images.

17. The non-transitory machine-readable medium of claim 15, wherein the instructions that when executed cause the at least one processor to undistort the first and second images comprise instructions that when executed cause the at least one processor to:
- match multiple feature points in common between the first and third images and between the second and third images;
- estimate a first pose between the first image sensor and the image depth sensor and a second pose between the second image sensor and the image depth sensor using the matched feature points;
- project the matched feature points onto an image plane using the first depth map;
- generate an undistortion map for each of the first and second images using the projected feature points; and
- undistort each of the first and second images using the corresponding undistortion map.

18. The non-transitory machine-readable medium of claim 15, wherein the instructions that when executed cause the at least one processor to rectify the first and second images comprise instructions that when executed cause the at least one processor to:
- match multiple feature points in common between the first and second images;
- estimate a pose between the first image sensor and the second image sensor using the matched feature points; and
- warp at least one of the first and second images.

19. The non-transitory machine-readable medium of claim 15, wherein the instructions that when executed cause the at least one processor to generate the second depth map comprise instructions that when executed cause the at least one processor to:
- generate a depth histogram using the first depth map;
- generate a disparity histogram using the disparity map;
- generate a mapping function based on a comparison of the depth histogram and the disparity histogram; and
- generate the second depth map using the mapping function.

20. The non-transitory machine-readable medium of claim 15, wherein the resolution of the second depth map is substantially equal to the resolution of the first and second images.

* * * * *